(12) United States Patent
Reddy et al.

(10) Patent No.: US 8,647,399 B2
(45) Date of Patent: Feb. 11, 2014

(54) FIRE STARTER

(75) Inventors: Vilambi Reddy, Cranbury, NJ (US);
Anil Torgalkar, Cranbury, NJ (US);
Lionel Xavier, TamilNadu (IN)

(73) Assignee: APPTEC, Inc., Cranbury, NJ (US)

( * ) Notice: Subject to any disclaimer, the term of this patent is extended or adjusted under 35 U.S.C. 154(b) by 0 days.

(21) Appl. No.: 13/615,537

(22) Filed: Sep. 13, 2012

(65) Prior Publication Data
US 2013/0247455 A1 Sep. 26, 2013

(51) Int. Cl.
*C10L 5/00* (2006.01)
*C10L 5/44* (2006.01)

(52) U.S. Cl.
USPC ............ 44/605; 44/563; 44/533; 44/535

(58) Field of Classification Search
USPC ........... 44/520, 521, 522, 532, 533, 535, 589, 44/590, 605, 606, 593, 594, 596, 597, 598, 44/563; 431/288–291
See application file for complete search history.

(56) References Cited

U.S. PATENT DOCUMENTS

| | | | |
|---|---|---|---|
| 1,839,982 A | 1/1932 | McCaughey | |
| 2,854,321 A | 9/1958 | Stanton | |
| 3,098,860 A | 7/1963 | Ericks | |
| 3,402,029 A | 9/1968 | Sampson, Jr. et al. | |
| 4,188,192 A | 2/1980 | Levenson et al. | |
| 4,382,802 A | 5/1983 | Beinke et al. | |
| 4,386,937 A | 6/1983 | Fareri et al. | |
| 4,417,900 A | 11/1983 | Barthel | |
| 4,485,584 A | 12/1984 | Raulerson et al. | |
| 4,487,572 A | 12/1984 | Parker | |
| 4,518,394 A | 5/1985 | Templin et al. | |
| 4,878,922 A | 11/1989 | Kaye | |
| 5,244,472 A * | 9/1993 | Simmons | 44/505 |
| 5,638,807 A | 6/1997 | Flamenbaum | |
| 5,833,353 A * | 11/1998 | Smith | 362/180 |
| 5,990,057 A | 11/1999 | Sharp | |
| 6,027,539 A | 2/2000 | Toy | |
| 6,093,224 A | 7/2000 | Jones | |
| 6,379,405 B1 | 4/2002 | Reiger et al. | |
| 6,508,849 B1 | 1/2003 | Comas | |
| 6,913,010 B2 | 7/2005 | Noble | |
| 7,030,073 B2 | 4/2006 | McCammon | |
| 2002/0129808 A1* | 9/2002 | Manner | 126/45 |
| 2004/0025418 A1* | 2/2004 | Freisthler | 44/398 |
| 2011/0126452 A1* | 6/2011 | Blackmore | 44/522 |

FOREIGN PATENT DOCUMENTS

FR    2808665 A1 * 11/2001

* cited by examiner

*Primary Examiner* — Pamela H Weiss
(74) *Attorney, Agent, or Firm* — Stanley H. Kremen

(57) ABSTRACT

The Present Invention is a fire starting device for use as kindling manufactured from pine straw, as the primary component, a vegetable oil, natural resins, and an herbal component. The device is hollow, having at least one vertical channel and at least one horizontal channel drilled from the outer wall of the device to the inner vertical channel. The fire starter device is ignited from the top, and it burns to produce a high, intense flame that ignites other flammable materials having a much greater kindling temperature. The height of the flame and the burn duration are controlled by the overall size of the device and the sizes of the channels. The device burns clean with a minimum of smoke and harmful or noxious fumes. Burning the device minimally creates air pollution. It burns completely with a minimum of ash residue.

14 Claims, 4 Drawing Sheets

FIRE STARTER

FIELD OF THE INVENTION

The Present Invention relates to manufactured articles that once ignited, burn and produce a flame with sufficient strength to ignite other flammable materials, which are difficult to ignite.

BACKGROUND OF THE INVENTION

Fire Starter manufactured articles have been around for many years. In many cases, long-burning flammable materials have very high kindling temperatures or are impregnated with moisture, thereby making them very difficult to ignite. Examples of these materials are charcoal and firewood. In order to ignite these long-burning materials, one must set a fire starter material having a far lower kindling temperature on fire, and place the long-burning material into the flame from the fire starter for a sustained period. Some fire starter materials have a naturally low kindling temperature. Others are easy to ignite due to their size and configuration. Small wood chips, shavings, and particles are easier to ignite than a log. For one example, in order to start a fire in a fireplace, one places paper and kindling wood (usually twigs) underneath the logs. One then sets the paper on fire, the flames from which ignite the kindling wood. The flames from the kindling wood burn under the logs for a sustained period, and the logs eventually ignite. For a second example, in order to ignite charcoal briquettes in a barbecue pit, one pours lighter fluid over the briquettes. Lighter fluid has a very low kindling temperature. However, before the lighter fluid burns away completely, its flame ignites the briquettes.

The U.S. patent prior art is replete with fire starter devices dating back to 1932, or perhaps earlier. Virtually all of these impregnate a solid article with petroleum based hydrocarbons. These devices release potentially harmful fumes when they burn. Often, the fumes impregnate foods that are cooked with the fires that these devices start. Some of these devices emit sulfur and phosphorus when they burn.

It would be desirable to have a fire starter that is manufactured from renewable natural materials. The advantage of such a device is that it is "green," it would emit no smoke, no petroleum byproducts, no chemicals, and would leave a minimum ash residue. Fires started with such a device would be safer to use when cooking food.

SUMMARY OF THE INVENTION

The Present Invention is a hollow physical device preferably fabricated from pine straw. Once ignited, its unique shape permits it to burn with an intense flame that extends much higher than the height of the device itself. The device burns for a long time when compared with prior art fire starter devices. It emits a minimum amount of smoke, and there are no harmful fumes. When completely spent, a minimum of ash residue remains.

BRIEF DESCRIPTION OF THE DRAWINGS

FIG. 2 shows two-dimensional top, front, and side views of the device of FIG. 1.

DETAILED DESCRIPTION OF THE INVENTION

The fire starter device is fabricated using a specific composition that is produced in a particular shape. The primary ingredient in the composition is pine straw. Pine straw is sold in most home goods and lumber stores. It is used primarily as mulch. Pine straw consists essentially of pine needles. However, it may also comprise wood chips, shavings, or other wood materials. It may further comprise cellulose materials, such as paper, cardboard, or sawdust. Although pine needles do not disintegrate easily, they are still biodegradable. Burning pine needles minimizes the amount of harmful phenolic resin emissions. They burn clean, and leave a minimum amount of ash when spent.

The composition comprises:
1. pine straw,
2. vegetable oil,
3. natural resins (used as a binder), and
4. an herbal component.

The vegetable oil can be palm oil, corn oil, olive oil, soybean oil, coconut oil, peanut oil, sesame oil, etc. The preferred natural resin is beeswax. Herbal component examples are *cinnamomum* and *camphora*.

The makeup of these ingredients is:

| Ingredient | Range % (by weight) | Ideal % (by weight) |
| --- | --- | --- |
| Pine Straw | 70-75 | 70 |
| Vegetable Oil | 5-10 | 8 |
| Natural Resins | 10-20 | 20 |
| Herbal Component | 1-5 | 2 |

Figure 1:
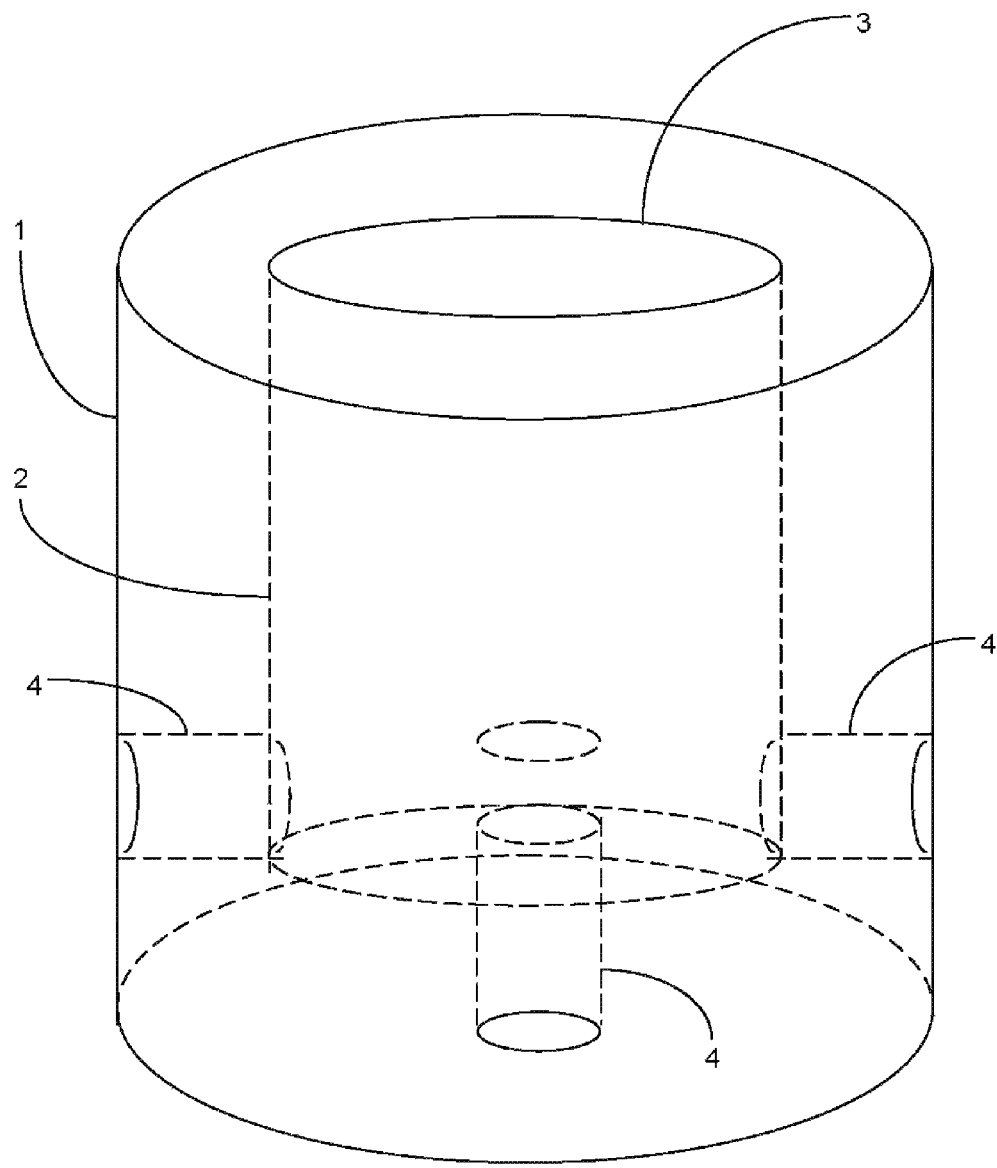
FIG. 1 is an isometric view of the cylindrical embodiment of the Present Invention using hidden lines to show the internal structure of the device.
Figure 2A:
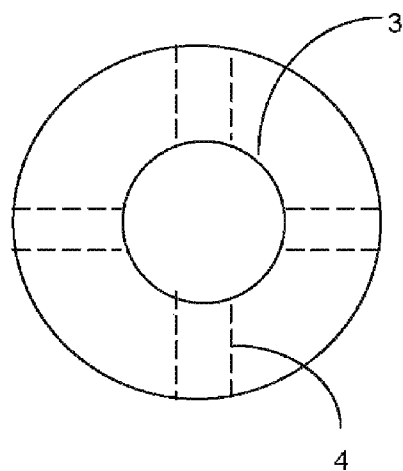
FIG. 2A is a top plan view.
Figures 2B, 2C:
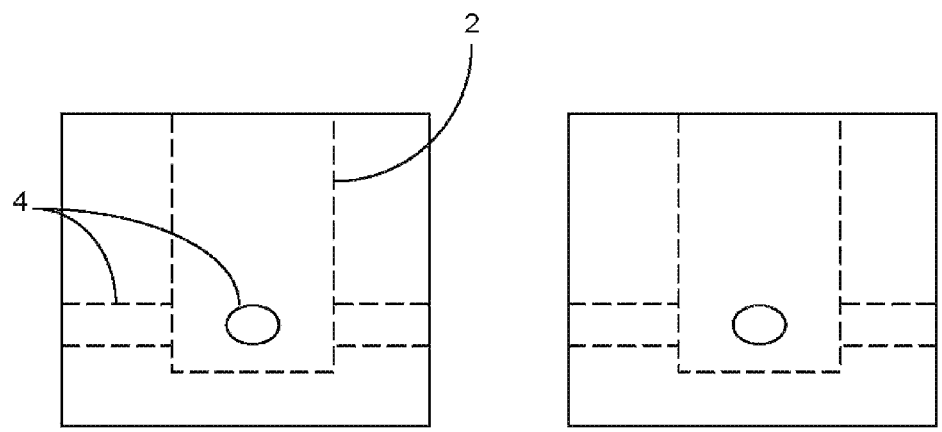
FIG. 2B is a front elevation.
FIG. 2C is a side elevation.
Figure 3:
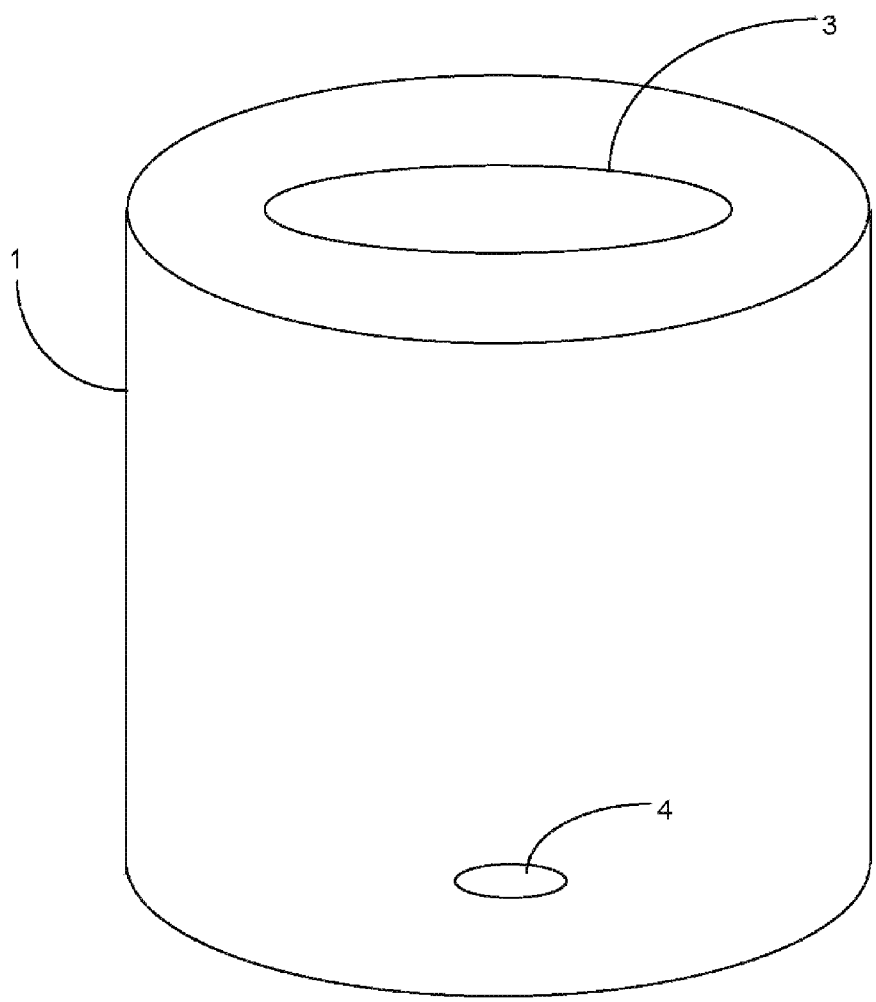
FIG. 3 is an isometric front view of the device of FIG. 1 that shows the external structure only.
Figure 4:
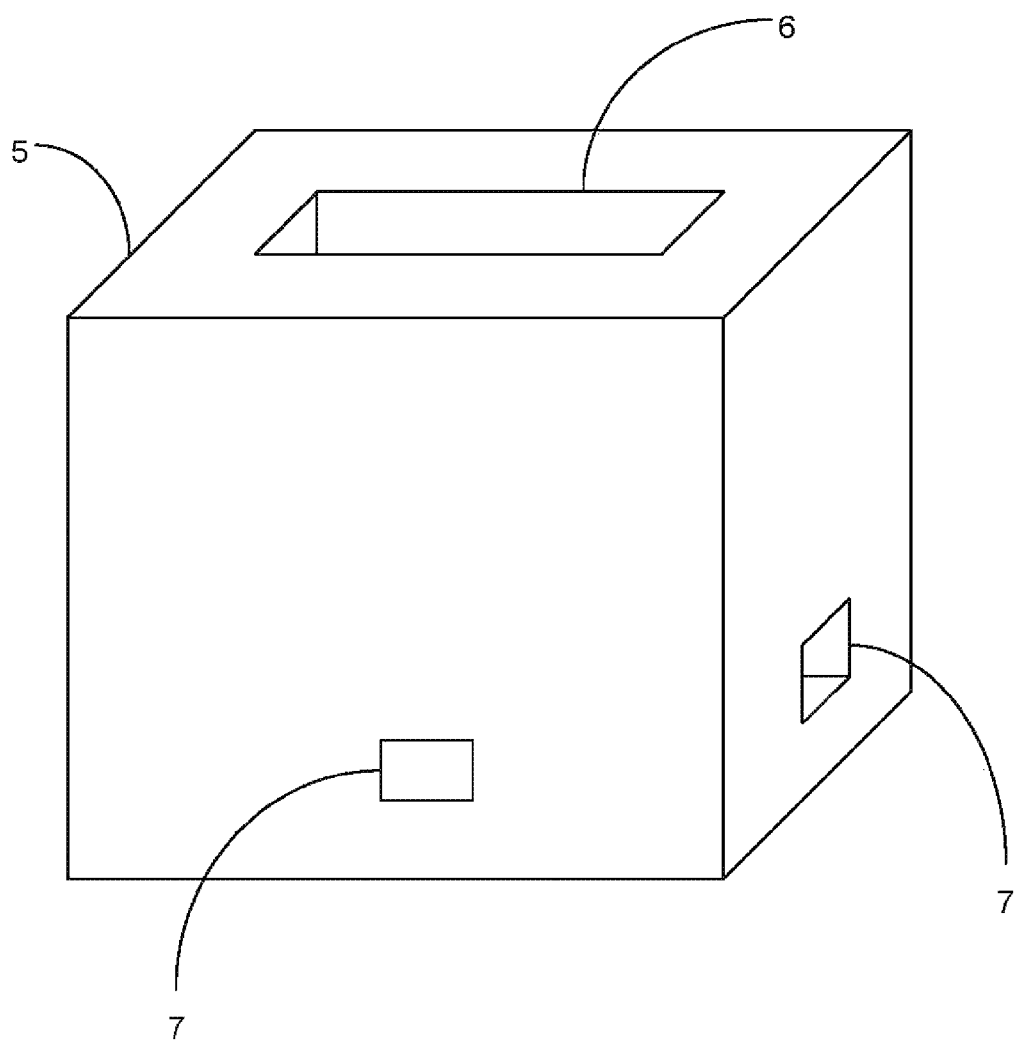
FIG. 4 is an isometric view of the cubic embodiment of the Present Invention.

FIGS. 1-3 show an exemplary cylindrical embodiment of the device of the Present Invention. FIG. 4 shows an exemplary cubic embodiment of the device of the Present Invention.

The device is fabricated as follows:

Dry the pine straw or wood material.

Pulverize the pine straw or wood material.

Prepare a liquid blend of the other three ingredients.

Blend the liquid into the pulverized wood material to form a uniform dispersion.

Weigh and transfer to a die.

Press to form into shape.

The exact configuration of the structure of the device determines the flame height and burn duration. The device is hollowed out to form channels for the flow of air to sustain the flame. The channels form a part of the structure. FIG. 1 shows the cylindrical embodiment of the device. A minimum of one vertical channel is bored into the device; however a plurality of vertical channels may be created. The embodiment shown in FIG. 1, having one vertical channel 3, forms an annular cylinder having an outer cylindrical surface 1 and an inner cylindrical surface 2. The vertical hollow channel does not travel through the height of the cylinder. The uppermost horizontal surface of the device is an annulus, while the bottom surface of the device is a circle.

A plurality of smaller air-vent channels are drilled horizontally from the outer wall to the inner wall, thereby allowing air to flow from the outside of the device into the central vertical channel. There must be at least one horizontal channel. In FIG. 1, four channels 4 are shown. The structure is made clearer in FIG. 2 when viewed in two-dimensions. FIG. 3 is an isometric view of the same embodiment. In that drawing, the vertical channel 3 and only one horizontal channel 4 are shown. The size of the channels controls the burn time and the height of the flame. Making the diameter or bore of the horizontal channels larger and using a greater number of horizontal channels produces a longer burning flame. Making the diameter or bore of the central vertical channel smaller produces a taller flame. The shape of the channels need not be the same as the shape of the device. For example, a cubic device may have cylindrical channels and vice versa. FIG. 4 is an isometric of a cubic or rectangular prism device, where the channels are all formed as hollow rectangular prisms. Optionally, the entire device may be placed in a waterproof pouch. Eventually, the entire device burns to ash.

In operation, one lights a fire on the top of the vertical channel of the device. Air then flows automatically through the horizontal channels into the vertical channel, thereby feeding the flame. The flame grows higher. With the exemplary embodiment of FIGS. 1-3, typical dimensions of such a structure would be:

Outer Cylindrical Diameter=70 mm;
Vertical Channel Diameter=16 mm;
Height=50 mm;
Air vent horizontal channel size at bottom—10 mm width and depth 12 mm (4 channels @90 degrees).

Experimentally, the device described above was ignited with a match. It burned with a flame height which was approximately 100 mm higher than the topmost surface of the device. The device burned for approximately eight minutes. When it was entirely consumed, there was a minimum of ash residue.

We claim:

1. A fire starter, which is a manufactured article fabricated from a composition comprising:
    pulverized and dried pine straw into which a liquid mixture or emulsion has been blended, wherein said liquid mixture or emulsion comprises
        i) vegetable oil,
        ii) one or more natural resins, and
        iii) an herbal component,
    wherein said fire starter is solid, rigid, and dry, and formed into a desired shape, which comprises internal hollow ventilation channels to facilitate rapid inception of burning and a long lasting fire, and
    wherein:
        a) the amount of the pine straw is in the range of 70-75 percent by weight;
        b) the amount of the vegetable oil is in the range of 5 to 10 percent by weight;
        c) the amount of the one or more natural resins is in the range of 10 to 20 percent by weight; and
        d) the amount of the herbal component is in the range of 1 to 2.5 percent by weight.

2. The fire starter of claim 1 wherein the pine straw comprises pine needles.

3. The fire starter of claim 2 wherein the pine straw further comprises wood materials selected from the group consisting of wood chips, wood shavings, and sawdust.

4. The fire starter of claim 2 the pine straw further comprising paper or cardboard.

5. The fire starter of claim 1 wherein the vegetable oil is palm oil, corn oil, olive oil, soybean oil, coconut oil, peanut oil, or sesame oil.

6. The fire starter of claim 1 wherein the one or more natural resins comprises beeswax.

7. The fire starter of claim 1 wherein the herbal component is *cinnamonium camphora*.

8. The fire starter of claim 1 wherein:
    a) the amount of the pine straw is 70 percent by weight;
    b) the amount of the vegetable oil is 8 percent by weight;
    c) the amount of the one or more natural resins is 20 percent by weight; and
    d) the amount of the herbal component is 2 percent by weight.

9. The fire starter of claim 1 comprising a rigid solid fabricated from the composition and further comprising:
    a) an outer surface and a solid volume consisting of the composition;
    b) at least one hollow vertical channel having an inner surface, wherein said vertical channel penetrates the outer surface, but does not penetrate the entire volume; and
    c) at least one hollow horizontal channel, wherein said horizontal channel penetrates both the outer surface and the inner surface of the hollow vertical channel.

10. The fire starter of claim 9 wherein the at least one hollow horizontal channel intersects the inner surface of the hollow vertical channel in a direction perpendicular to said inner surface.

11. The fire starter of claim 9 comprising a plurality of hollow horizontal channels.

12. The fire starter of claim 9 comprising a plurality of hollow vertical channels.

13. A process to manufacture the fire starter of claim 9 comprising:
    a) drying the pine straw;
    b) pulverizing the pine straw;
    c) preparing a liquid mixture or emulsion of the vegetable oil, at least one natural resin, and the herbal component;
    d) blending the liquid mixture or emulsion into the pulverized pine straw until a uniform blend is formed;
    e) weighing the blend;
    f) transferring the blend into a die; and
    i) pressing the blend in the die to compress the blends and to form it into a desired shape.

14. The process of claim 13 further comprising drilling or boring the at least one hollow vertical channel and at least one hollow horizontal channel into the fire starter.

\* \* \* \* \*